US012094262B2

(12) United States Patent
Einecke et al.

(10) Patent No.: US 12,094,262 B2
(45) Date of Patent: Sep. 17, 2024

(54) METHOD AND SYSTEM FOR VERIFYING VEHICLE USAGE DATA

(71) Applicant: HONDA RESEARCH INSTITUTE EUROPE GMBH, Offenbach/Main (DE)

(72) Inventors: Nils Einecke, Offenbach (DE); Sven Rebhan, Offenbach (DE)

(73) Assignee: HONDA RESEARCH INSTITUTE EUROPE GMBH, Offenback/Main (DE)

( * ) Notice: Subject to any disclaimer, the term of this patent is extended or adjusted under 35 U.S.C. 154(b) by 532 days.

(21) Appl. No.: 16/942,911

(22) Filed: Jul. 30, 2020

(65) Prior Publication Data
US 2021/0043012 A1 Feb. 11, 2021

(30) Foreign Application Priority Data
Aug. 6, 2019 (EP) ..................... 19190206

(51) Int. Cl.
| G07C 5/00 | (2006.01) |
| G06F 16/25 | (2019.01) |
| G06F 21/60 | (2013.01) |
| G07C 5/02 | (2006.01) |
| H04W 4/02 | (2018.01) |
| H04W 4/40 | (2018.01) |

(52) U.S. Cl.
CPC ............ *G07C 5/02* (2013.01); *G06F 16/252* (2019.01); *G06F 21/602* (2013.01); *G07C 5/008* (2013.01); *H04W 4/023* (2013.01); *H04W 4/40* (2018.02)

(58) Field of Classification Search
CPC ........... G07C 5/02; G07C 5/008; H04W 4/40; H04W 4/023; G06F 16/252; G06F 21/602
See application file for complete search history.

(56) References Cited

U.S. PATENT DOCUMENTS 10,325,491 B1 * 6/2019 Fields .............. G08G 1/096827
2004/0093146 A1 5/2004 Gustavsson et al.
(Continued)

OTHER PUBLICATIONS

Extended European Search Report dated Feb. 5, 2020 corresponding to European Patent Application No. 19190206.3.

*Primary Examiner* — Peter D Nolan
*Assistant Examiner* — Roy Rhee
(74) *Attorney, Agent, or Firm* — SQUIRE PATTON BOGGS (US) LLP

(57) ABSTRACT

A vehicle transmits vehicle data to an observer entity when the vehicle and the observer entity are in proximity. The vehicle data includes unique vehicle identification information; proximity is defined by an upper threshold for a distance between the vehicle and the observer entity. The observer entity adds data to the vehicle data, the added data including an indication of a position of the observer entity and a time stamp indicating a time of reception of the vehicle data to generate joint data. The joint data is transmitted to an external database and the aforementioned steps are repeated. From the added data a usage estimation value is calculated which is a measure for usage of the vehicle and which is compared with the vehicle usage data retrieved from the vehicle. Information on validity of the vehicle usage data based on the comparison result is generated and output.

23 Claims, 8 Drawing Sheets

(56) References Cited

U.S. PATENT DOCUMENTS

| | | | |
|---|---|---|---|
| 2007/0069921 A1* | 3/2007 | Sefton | G06V 20/52 |
| | | | 340/932.2 |
| 2014/0218527 A1* | 8/2014 | Subramanya | G01S 13/04 |
| | | | 348/148 |
| 2017/0053461 A1 | 2/2017 | Pal et al. | |
| 2018/0181955 A1* | 6/2018 | Woods | G06Q 20/3821 |
| 2019/0004536 A1* | 1/2019 | Ebrahimian | G08G 1/0175 |
| 2019/0035173 A1 | 1/2019 | Harvey et al. | |
| 2019/0238322 A1* | 8/2019 | Wang | H04L 63/126 |
| 2020/0393259 A1* | 12/2020 | Gantt, Jr. | B60L 53/65 |

* cited by examiner

METHOD AND SYSTEM FOR VERIFYING VEHICLE USAGE DATA

BACKGROUND

Field

The invention regards a method and a system for verifying vehicle usage data, in particular mileage or counted operating hours.

Description of the Related Art

Manipulation of data that is internally generated by a vehicle to inform a user but also a potential buyer of the vehicle on how much the vehicle was used is a serious problem. For example, odometer fraud to reduce the mileage of cars, motorcycled or operating hours of working machines takes only minutes and can be performed easily. The motivation for people to manipulate the vehicle usage data typically is the expectation to increase a resales price or to circumvent penalties and lease contracts. On the other hand, it is rather difficult to detect such fraud and, for example, a private buyer usually is unable to detect odometer fraud by himself at all.

A plurality of solutions has been described in the art. For example, U.S. Pat. No. 9,367,967 B2 describes a system for monitoring the meter of a vehicle. The vehicle itself compares current meter values to simultaneously recorded position data. The comparison allows to detect implausible deviations, for example, in case that the increase in mileage is less than a distance derived from the recorded position data. Apart from performing such a verification on board the vehicle, the data is sent to a central server where it is stored.

Of course, the entire condition of the car including component wearing, but also entries distributed over a plurality of ECUs mounted on the car, may be analyzed in order to conclude whether the displayed mileage of the vehicle match. However, such an analysis is very tedious and requires an expert. Previous suggestions, including the one mentioned above, are limited to measures on the vehicle itself. For example, chips using an AES (advanced encryption standard) encryption on the received odometer data and storing this encrypted data in a secured memory has been suggested. The encrypted data may then be retrieved from the memory, and plausibility checks can be performed. For example, later entries may not have lower values than previous ones.

One major problem of all the solutions that concentrate on the vehicle only is that a person tampering the meter has access to all physical elements of the car. Thus, manipulation could be performed by sending wrong odometer values right from the beginning, i.e. manipulating the sensor values. In such a case the plausibility checks will fail because consistency of the entries which are all based on the manipulated sensor data is maintained. Further, it is also possible to overwrite the memory with a previous state that was read out from the encrypted memory. Depending on the hardware layout it is also be possible to replace the chip.

Another approach to counteract odometer fraud is to regularly record and store odometer data in a database. This could be done by a service station where the service station's stuff enters the odometer value together with a vehicle identification into a public database. The problem is that such public database must then be available for a potential car buyer to enable him to check whether the odometer value shown in the car is plausible. Obviously, such a procedure has a massive privacy impact to the vehicle owner because his/her private data is publicly available. Such an approach may even cause a conflict with governmental regulations. Alternatively, the vehicles could automatically upload data as encrypted data thereby solving the privacy issue. However, every equipment that is included in the vehicle is accessible to his owner (or any person who intends to manipulate the data and has access to the vehicle) and consequently vulnerable. For example, spoofing wrong values or removing the special sending device would still be possible.

Thus, there is a need for a system and method to verify vehicle usage data preventing direct access of the vehicle owner or any other third party to all the involved equipment.

This objective is achieved by the method and system according to the present invention.

SUMMARY

According to the present invention vehicle data is transmitted to an observer entity. The vehicle data includes at least a unique vehicle identification information that allows to identify the vehicle. The transmission of the vehicle data is performed in case that the vehicle is in proximity to the observer entity. The vehicle is considered to be in proximity to the observer entity when a distance between the vehicle and the observer entity is less than an upper threshold. The decision whether the distance between the vehicle and the observer entity is less than an upper threshold may be made based on actual knowledge of the absolute position of the vehicle and an absolute position of the observer entity. Alternatively, the upper threshold may be defined as being the maximum distance in which data communication between the vehicle and the observer entity can be performed.

The system comprises the vehicle for which a verification of the vehicle usage data shall be performed and a plurality of different observer entities. The system furthermore comprises an external database and a central processor which are independent from the vehicle. The observer entities are also independent from the vehicle and specifically the vehicle owner. Thus, any kind of data processing that is performed by an observer entity and/or the central processor cannot be influenced by the vehicle owner. This is particularly true for the observer entities because the vehicle while being driven is in proximity to a specific observer entity by chance.

The vehicle comprises a metering unit generating the vehicle usage data. Such vehicle usage data may be mileage or an operating hours count. The vehicle sends the vehicle data to an observer entity when it comes in proximity to the observer entity.

After receiving the vehicle data, data being correlated to vehicle usage and which is known to the observer entity is added to vehicle data by the observer entity to generate joint data, which is then transmitted to the external database. Data is considered to be correlated to the vehicle usage if the data depends from the amount of vehicle usage. This can be any type of where, for example, tire wear or the like but also a distance between successively visited observer entities that allow to estimate a driven distance. The central processor is used to store the joint data in the external database, thereby making sure that no tampering may be performed, because the central processor and the external database are not accessible by the vehicle owner. Preferably, transmission of the vehicle data is performed by the vehicle every time it comes into proximity of an observer entity but at least a plurality of times.

The vehicle and the observer entities each are equipped with processors and data communication interfaces in order to enable transmission of the vehicle data and joint data. The joint data is collected and stored in the external database and a usage estimation value is calculated from the added data associated with a unique vehicle identifier such as a vehicle identification number. For verification of the vehicle usage data originally generated in the vehicle, the estimation value is compared to the vehicle usage data retrieved from the vehicle. The vehicle usage data might be transmitted directly by the vehicle to the external database together with its unique vehicle identification, or the vehicle usage data can be included in the vehicle data that is transmitted to the observer entity.

Finally, based on the comparison result between the usage estimation value and the vehicle usage data, information on validity of the vehicle usage data is generated and output. This validity information may be a simple statement confirming that vehicle usage data corresponds to the estimated vehicle usage or may include more detailed information, for example, including the usage estimation value and also the vehicle usage data retrieved from the vehicle.

The advantage of the proposed method and system primarily lies in the fact that the car owner (or any other third party) cannot know in advance which observer entity may be in proximity to the vehicle in the future. Since data transmission is performed automatically when proximity of the vehicle to an observer entity is detected by the vehicle, no manipulation is possible.

Advantageous embodiments and further aspects are defined in the dependent claims.

According to a preferred embodiment, the observer entity determines a time of reception of the vehicle data and adds a respective timestamp. Additionally or alternatively, the observer entity adds an indication of its own position. This indication of the observer entities position allows to identify an approximate position of the vehicle at a certain point in time. By adding the timestamp and/or the indication of the observer entity's position is possible to estimate a minimum travel distance of the vehicle and/or the duration of use. Since the timestamp and/or information indicating the position of the observer entity are determined independently from the vehicle, it is almost impossible to pretend a lesser amount of use.

The position of the observer entity may be known in advance. In that case, the observer entity may only provide and add as an information indicating its position its own identity, and the position itself is then determined, for example, using a lookup table. On the other hand, it is also possible that the position is actively determined by the observer entity. In case of an active determination of the position of the observer entity, a global navigation satellite system (GNSS) like Galileo, GPS, Glonass, Beidou or any other known system might be used. Alternatively, signals of surrounding infrastructure elements that are used for infrastructure-to-vehicle communication, SLAM (for example, visual SLAM), odometry, triangulation from cellular network signals, or any other method suitable to locate the observer entity with respect to a known common global reference point can be used.

The timestamp can be derived by the observer entity from an internal clock or external time services like DCF 77, NTP or SNTP, or from the GNSS.

According to a preferred embodiment, the vehicle data does not only include unique vehicle identification information but also the vehicle usage data. Thus, the vehicle usage data is transmitted to the observer entity each time the approximate position is transmitted to the external database. The vehicle data is associated with a timestamp in the position of the observer entity. Since the vehicle data, to which information from the observer entity is added, is then forwarded to the external database, consistency of the trend of the vehicle usage data can be analyzed independently from a final mileage that is retrieved from the vehicle. Thus, it is not necessary to additionally transmit the vehicle usage data directly from the vehicle to the external database in order to be able to compare the usage estimation value and the vehicle usage data.

According to another preferred embodiment, the vehicle transmits vehicle data to an observer entity and simultaneously transmits vehicle usage data to the external database. The redundancy of transmission of the vehicle usage data allows a further plausibility analysis. The two independent transmission channels further reduce the possibility of tampering the data.

According to another preferred embodiment, the comparison of the vehicle usage data and the usage estimation value is performed by the central processor, which is entirely independent from the vehicle. Thus, since only a result may be given back by the central processor to a dedicated person or the unit that requested the verification of the vehicle usage data and independent verification can be performed.

Using observer entities which are entirely independent from the vehicle already gives a high level of confidence on the verification results. Nevertheless, it is preferred to add a validation token to the vehicle data, before transmitting the data to the observer entity. Such a validation token can be used in order to verify the integrity and authenticity of the message. The verification may be performed by any third party like the central processor, a potential car buyer or manufacturer's car service personnel. Generally, a validation token used for the present invention, may consist of a cryptographic hash of the transmitted data, a digital signature based on cryptographic methods such as RSA (Rivest, Shamir, Adleman), DSA (Digital Signature Algorithm), Elliptic Curve Digital Signature Algorithm (ECDSA), Edwards-curve DSA, ElGamal signature scheme or any other known method suited to ensure the integrity and authenticity of the data. It is particularly preferred that also the observer entity adds a validation token to the joint data, i.e. after adding data to the vehicle data.

According to a further preferred embodiment, the joint data is sent back from the observer entity to the vehicle and the vehicle forwards it to the external database. Before forwarding the joint data to the external database the joint data is preferably encrypted in the vehicle. In any case, sending the joint data back from the observer entity to the vehicle has the advantage, that's the car manufacturer may establish a proprietary system for transmitting data from the vehicle to the external database. It is not necessary that the observer entity itself can communicate with the external database. It might be thought of a standard for the communication between the vehicle and the observer entity but that on the other hand each vehicle manufacturer establishes his own system, in particular, with respect to the encryption used.

Generally, for encrypting the data by the vehicle, the observer entity, or both, known cryptographic methods such as symmetric encryption (AES, DES, TripleDES, Blowfish, Twofish, Serpent or others), asymmetric encryption methods (RSA, elliptic curve, ElGamal, DSA, Diffie-Hellman or others) or combinations thereof may be used.

According to another advantageous embodiment, the vehicle data is encrypted before it is transmitted from the vehicle to the observer entity. Using encrypted data has the advantage that the privacy of the data is ensured. This is particularly preferred if, additionally, also the observer entity encrypts at least the added data. Encrypting both, the vehicle data and also the added data is the basis for performing a privacy-preserving computation of the validation metric. That is, all participating parties (vehicle, observer entities, central processor and database) do not learn anything new (nothing, besides what they already know before the computation) about any of the other parties' data. One way to implement the privacy-preserving computation is to process the entire data in the encrypted space which is a most preferred embodiment. In case of such a homomorphic encryption, all computations are performed directly on the encrypted data. The central processor, which is an independent entity, can perform all calculations necessary for cross-checking the vehicle usage data and the added data of the observer entities without decrypting the data. Thus, privacy of vehicle owner but also the owners of the observer entities is maintained. Decryption of the final output result may then be performed, for example, by the owner of the vehicle or a dedicated person to whom the result was sent.

An alternative to implement the privacy-preserving computation of the validation metric is to use a secure multi-party-computation (MPC). To do this, the central processor sends the encrypted data back to the entities (observer entities and vehicle) that encrypted the data. Each entity then decrypts the data using their private key or symmetric key, respectively. The clear-text data is then secret-shared using an MPC protocol (e.g Shamir secret sharing, Yao's garbled circuit protocol, Ben-Or-Goldwasserr-Wigderson protocol, Smart-Pastro-Damgård-Zakarias protocol or others as well as derivatives and combinations thereof). Secure MPC guarantees that none of the parties learns anything new about any secret (vehicle or observer data) given that at least a certain amount of parties is honest and does not share its data share with others. Using MPC, the validation metric is computed such that in the end all parties know the value of the validation metric computation, including the vehicle itself if it is one of the computing parties, without revealing any input data. In an additional embodiment, the participating parties add a validation token (e.g. a cryptographic signature) to the computation result and send both to the vehicle owner or a dedicated person requesting the result.

According to a further preferred embodiment, at least one of the observer entities is a movable entity, like another car or, more generally any vehicle that is capable to determine its own position. As mentioned above, determination of its position may be performed by the vehicle using a GNSS, SLAM, triangulation, or the like. Determining its own position may also cover the capability of the movable entity to communicate with any available infrastructure that provides information allowing to determine the position of the movable entity. Using movable entities like vehicles as observer entities has the advantage, that it may not at all be predicted where and when the vehicle comes into proximity to the observer entity.

Further, it is an advantage when also stationary units are used as observer entities. Thus, every unit which is a participant in a vehicle-to-everything communication system can be used for generating joint data. It is also possible to use only movable vehicles for generating the joint data but additionally use stationary units for transmitting further information to the external database thereby enhancing the database for later analysis. Such further information may be analyzed in order to determine plausibility of reported mileage or operating hours of the vehicle. For providing further information, it is not essential that the position of the respective stationary unit is known. Associating the further information with a timestamp nevertheless allows to conclude whether the reported mileage (or operating hours) are likely to be correct. Stationary units might be for example service stations or other instances maintaining the vehicle, but also governmental systems like toll stations, speed cameras etc. or infrastructure systems like fuel- or charging stations. The further information can differ depending on the type of the stationary unit. Governmental systems, for example, may provide information like a registration number detected from number plate whereas workshops or the like are likely to provide information on wearing of parts related to the distance travelled. Examples are replacement of brake pads, V-belts, clutch, wearing of tires, state or usage of fluids (oil, fuel additions, cooling water, brake fluid). Gas stations or charging stations may provide information on the amount of charged energy, amount of fuel consumed number of charging processes, overall charging time, wearing of the battery and the like. Particularly, the detection of the number plate would give at least some information on vehicles where the owner manipulated the vehicle to entirely prevent it from transmitting any data.

It is further preferred, that the generation of the information on the validity of the vehicle usage data is performed in response to a request from an inquirer, which will usually be the vehicle owner, and that this information is then output together with a signature to the inquirer. The signature is used in order to ensure integrity and authenticity of the received information on the verification. The vehicle owner may request proof of the status of his car by sending the respective request for verification, for example, of the vehicle's mileage to the central processor. The central processor then first computes the usage estimation value and performs the comparison with the reported mileage of the vehicle. Then, the central processor computes its signature (validation token) on the results and also mileage reported by the vehicle. The data is then sent back by the central processor, advantageously encrypted, together with the signatures to the device requesting the validation which might be the vehicle of vehicle owner or PC or mobile device such as laptop, smartphone or tablet. The result may also be transmitted to an interested recipient when this is defined in the request.

According to one example, the usage estimation value can be calculated by accumulating distances between positions derived from the added observer information. The distances may be obtained by directly computing the air-line distance between the succeeding position entries. Alternatively, the distances may be obtained with higher precision by computing routes like a navigation system between succeeding position entries (based on the timestamp). The cumulated distances may then be compared with the reported mileage. If the deviation between the estimated usage value and the vehicle usage data does not exceed a threshold, the vehicle usage data (mileage, operating hours) is verified and a respective information is output.

In order to take account of times that the vehicle has not been seen, which means that no entry exists in the external database, the threshold allows a certain deviation. This deviation may increase with increasing mileage. The threshold may be determined statistically when designing the system. Alternatively, a score may be computed giving an indication of how probable the reported mileage is.

In particular, in the estimation value is based on air-line distances between succeeding position entries, it is obvious that the true travel distance exceeds the cumulated air-line distances. In such a case, it is preferred that the air-line distance sum is multiplied with a factor that is set in advance and that is determined, for example, from statistics.

According to another preferred embodiment, the vehicle is configured to select a subset of observer entities in case that a higher number of observer entities would be available for data transmission. Not sending the vehicle data to each and every available observer entity but only to a selected subset reduces the communication overhead. In order to select appropriate observer entities, the vehicle first has to identify which observer entities are currently in a range such that transmission of the vehicle data as possible. The selection may then be performed on the basis of a measured signal strength, bandwidth of the communication, the distances to the observer entities, the types of the observer entities, or may be based on random selection. When using the type of the observer entity, it could also be defined that in case that movable entities as well as stationary units are available, at least one observer entity of the subset has to be a movable entity. The distance between the vehicle and the potential observer entity can be determined either by evaluating the signal strength when communicating with the potential observer entity or be derived from position information. In that case, the vehicle needs to be able to determine its own position and, from communication with the observer entity, receive information on the observer entities current position.

It is to be noted that the preferred application of the present invention is prevention of mileage or operation hours fraud. Nevertheless, any vehicle data that might be subject to manipulation could also be verified in a similar fashion. Examples for such data could be chip IDs in order to prevent chip tuning, IDs of safety critical components (airbag, brakes, ADAS (Advanced Driver Assistance System)-ECU), number plate, allowances (environmental badge, motorway vignette) or insurance state.

For performing signature generation and encryption, public/private keys are used. These keys may be coupled to the car keys, which means the car keys are actually used as a memory for the private keys for signature generation and encryption. A single cryptographic key could be used for all physical keys of the same vehicle, however, individual cryptographic keys may be associated with each physical key of a vehicle. Individual keys may be helpful to separate vehicle data for different drivers.

BRIEF DESCRIPTION OF THE DRAWINGS

Further aspects and advantages of the present invention are now explained with reference to the annexed drawings in which.

DETAILED DESCRIPTION

Figure 1:
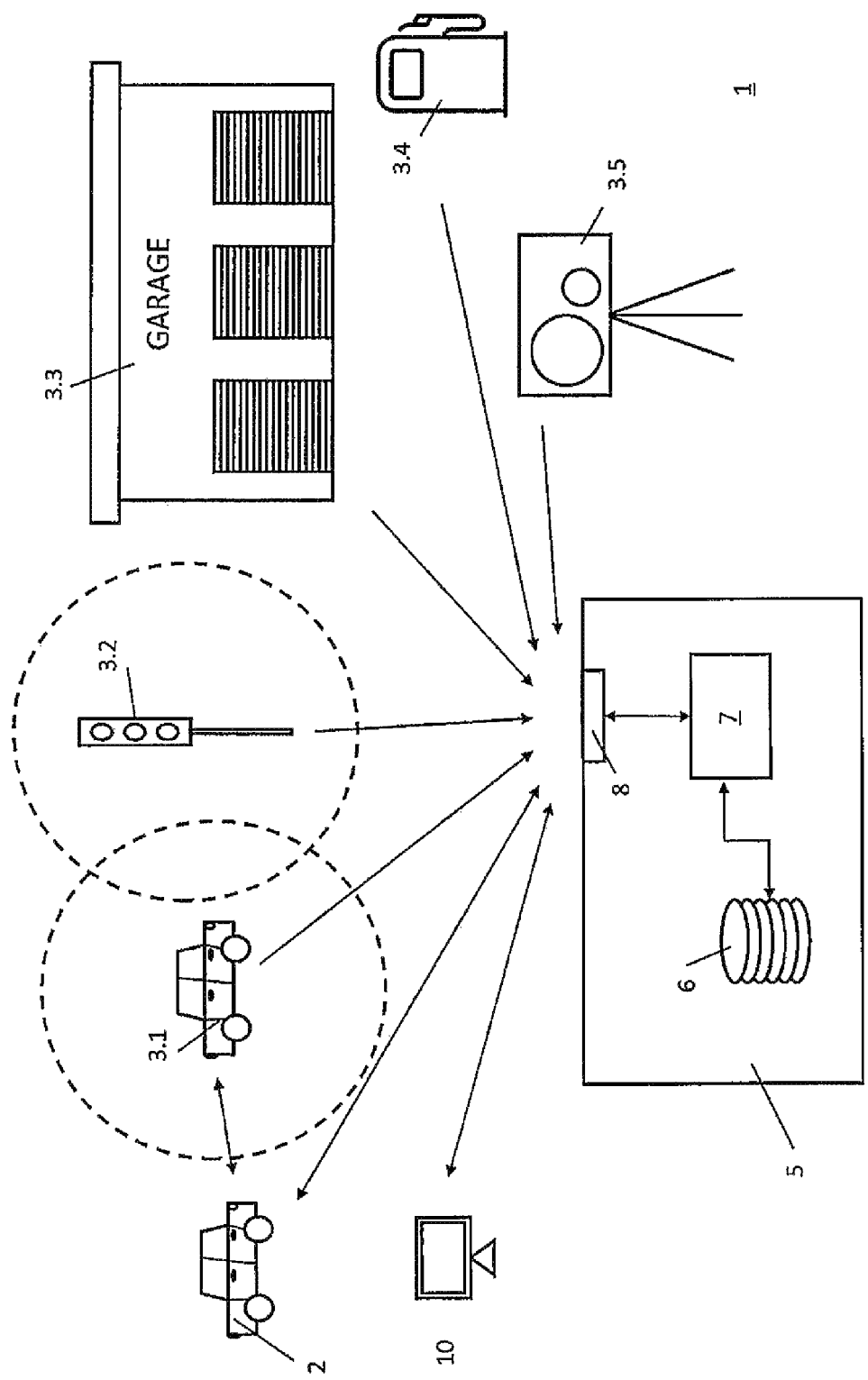
FIG. 1 shows an overall structure of the system according to the invention.

FIG. 1 shows an overall structure of a system 1 according to the present invention. The system 1 is used to validate vehicle usage data of a vehicle 2. Vehicle usage data may be any kind of meter data that is data which changes in response to operation of the vehicle 2. Preferred examples for such meter data are mileage or operating hours. Meter data is generated by means of internal sensors of the vehicle 2.

The system 1 further comprises a plurality of observer entities $3.x$. These observer entities $3.x$ are distributed in an environment in which the vehicle 2 is operated. Examples for such observer entities $3.x$ are another vehicle 3.1, which is a movable observer entity. Of course, any other vehicle that is capable to communicate with the vehicle 2 (the communication between the vehicle 2 and the observer entities $3.x$ will be explained later on), may be an observer entity 3.1. Only for simplicity of the illustration a single other vehicle 3.1 is shown as a representative.

Examples of further observer entities $3.x$ are traffic lights 3.2, service stations 3.3, gas/charging stations 3.4 and governmental instances like speed cameras 3.5 or toll stations. It is to be noted that the vehicle 2, the other vehicle 3.1, traffic lights 3.2, the service station 3.3 and the gas/charging station 3.4 may all be instances of a vehicle-to-everything communication system. The system 1 may further comprise other instances of such a vehicle-to-everything communication system.

On the other side, in the system 1 according to the present invention also instances may be included that are not part of such a vehicle-to-everything communication system. An example for such an additional instance is the speed camera 3.5. Further, the observer entities 3.2, 3.3 and 3.4 and 3.5 are examples for stationary entities.

During operation, the moving vehicle 2 may enter an area around an observer entity $3.x$, as indicated by the dashed lines around the other vehicle 3.1 and traffic lights 3.2, that defines an upper threshold for a distance within which communication between the vehicle 2 and the observer entity $3.x$ is possible. The maximum distance within which communication between the vehicle 2 and one of the observer entities $3.x$ is possible defines an upper threshold. When the distance between the vehicle 2 and the observer entity $3.x$ becomes less than the upper threshold, it is concluded that the vehicle 2 is in proximity to the respective observer entity $3.x$.

When the vehicle 2 is in proximity to an observer entity $3.x$, which will be assumed to be the other vehicle 3.1 for further explanation, the vehicle 2 transmits a message to the other vehicle 3.1 including vehicle data. The vehicle data at least comprises unique vehicle information and, preferably, vehicle usage data. Preferably, the data is encrypted and signed by the vehicle 2 before it is sent to the other vehicle 3.1.

Upon reception of the message from the vehicle 2, the other vehicle 3.1 adds information including information indicating a current position of the other vehicle 3.1 and also a time stamp indicating a time of reception of the message from the vehicle 2. By adding this information, the other vehicle 3.1 generates a new message including joint data, and transmits the data to an external, trusted server 5. In the external, trusted server 5 the joint data is stored in a database 6 using a processor 7 receiving the joint data via an interface 8. It is to be noted that the external, trusted server 5 may be realized by a server provided by the vehicle manufacturer, a public database or a public block chain. It is important to note that the external, trusted server 5 may be a single server or may consist of a plurality of distributed units.

It is possible to directly receive and store the joint data from the other vehicle 3.1 but it is also possible that the other vehicle 3.1 sends back the joint data as a message to the vehicle 2, which, probably after further processing the received message, forwards the joint data to the external, trusted server 5.

The above described process is repeated as often as the vehicle 2 comes in proximity of an observer entity 3.*x*. In order to avoid an unnecessary amount of data to be transmitted between involved entities, repetition of the transmission of the message from the vehicle 2 may be blocked for a certain period of time after the latest message transmission was performed.

As indicated by the arrow between the external, trusted server 5 and the vehicle 2 it is also possible that the vehicle 2 directly transmits a message to the external, trusted server 5 including the unique vehicle identification information but also the vehicle usage data.

The joint data may also be generated by another observer entity 3.*x* apart from the other vehicle 3.1. An example for such another observer entity 3.*x* is the traffic lights 3.2. In that case, since the traffic lights 3.2 are a stationary unit, the position of the traffic lights 3.2 is known in advance and can be stored in the memory of the external, trusted server 5. In such a case, the information indicating the position of the observer entity 3.2 could be provided by sending an only identification information of the traffic lights 3.2. Such an identification information may then be used to retrieve the position information for the traffic lights 3.2 internally in the external, trusted server 5.

The service station 3.3 is another example for a stationary unit. Such a service station might, different to the other vehicle 3.1 or the traffic lights 3.2 as explained above, be used to transmit further information to the external, trusted server 5. Such further information may be any kind of information that allows to derive usage information of the vehicle 2 or check plausibility of the vehicle usage data. This information may either be generated automatically, for example, by retrieving information from an internal computer system of the service station 3.3 used for processing orders like wheel change, oil change or the like or may be input by a service person of the service station 3.3, manually. In a similar way the gas/charging station 3 or 4 may provide information on refuelling the vehicle 2 or charging its battery. In order to correctly associate the further information, an automated detection of the number plate may be used.

Similarly, the speed camera 3.5 or cameras of a toll system determine registration number from an image of the number plate and generate a message including as an identifier of the vehicle the registration number associated with the time and position when and where the number plate was determined. The message is then transferred to the external server 5.

The validation is finally performed based on the entries in the database 6 by the processor 7. The validation is triggered by a request that can be received either from the vehicle 2, a PC, laptop, smart phone, tablet 10 or the like. The request is initiated by the owner of the vehicle 2. In the request, a recipient of the finally generated information on validity of the vehicle usage data can be defined. As a default, the information is sent back to the author of the request.

When a request is received by the external server 5, the processor 7 calculates a usage estimation value based at least on the successive position information stored associated with the vehicle identification information. The usage estimation value is then compared with an actual meter reading (vehicle usage data) of the vehicle 2. The actual meter reading may be the latest entry in the external server 5 or it could be included in the request. The usage estimation value may further take into consideration the further information that was received from the additional, stationary units. For example, based on an average fuel consumption known from similar vehicle models, an estimation for the mileage of the vehicle may be calculated on the basis of the total amount of consumed fuel. Similar considerations are valid for wearing of tires, brake pads, charging cycles including the total charge charged, and the like. Finally, information is sent back either to the inquirer or to a dedicated recipient, the information including information on validity on the actual meter reading. The information may be a final judgement or only the estimation value and latest reported vehicle usage data. Then, the final comparison and judgement is performed on the recipient side.

Figure 2:
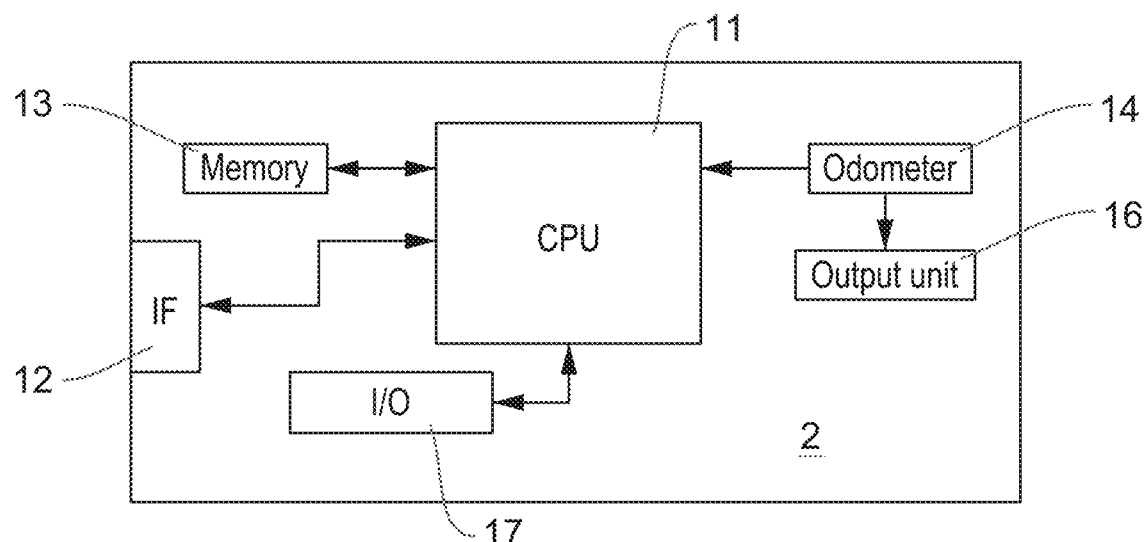
FIG. 2 is a schematic of the units involved in performing the inventive methods included in the vehicle for which validation of the vehicle usage data shall be performed.

FIG. 2 shows a schematic illustrating the main components of the vehicle 2 that are used in the verification process. It is obvious that in FIG. 2, only components and units of the vehicle 2 are illustrated that are used in the inventive method but no further components of the vehicle.

Data processing in order to generate messages that are sent to other entities is performed in a processor 11. The processor 11 may be a single processor or comprise a plurality of interconnected processors cooperating in order to perform the data processing. The processor 11 is connected to a wireless interface 12. The wireless interface 12 is used to transmit and receive messages including the data that needs to be transferred from one entity to the other. Further, the processor 11 is connected to a memory 13, where keys and algorithm are stored that are used by the processor 11 for data processing. For example, encryption algorithms that are used to increase data security may be stored in the memory 13 and also the respective keys. Further, the vehicle identification number used as vehicle identification information may be stored in the memory 13.

According to the preferred example, the mileage that is displayed in the vehicle 2 shall be verified. Thus, the vehicle 2 comprises an odometer unit 14, which outputs the actual mileage to an output unit 16, usually a display in the instrument panel of the vehicle 2. It is to be noted that instead of odometer unit 14, any metering device may be used that is capable to generate information reflecting the amount of usage of the vehicle 2. Alternatively, operating hours are used instead of the mileage, which is common for working machines.

The output of the odometer unit 14 is also provided to the processor 11, which, based on the vehicle identification information and the received output from the odometer unit 14, generates vehicle data that is sent as a message to an observer entity 3.*x* as explained above. Details of generating the message and transmission thereof will be explained later on with respect to three different detailed embodiments, establishing different levels of data security and privacy.

The vehicle 2 may further comprise an input/output terminal 17. Such input/output terminal 17 can display information to the owner or user of the vehicle and may further be configured to receive input from a user, for example, for triggering the sending of a request for validation of the actual mileage of the vehicle 2.

Figure 3:
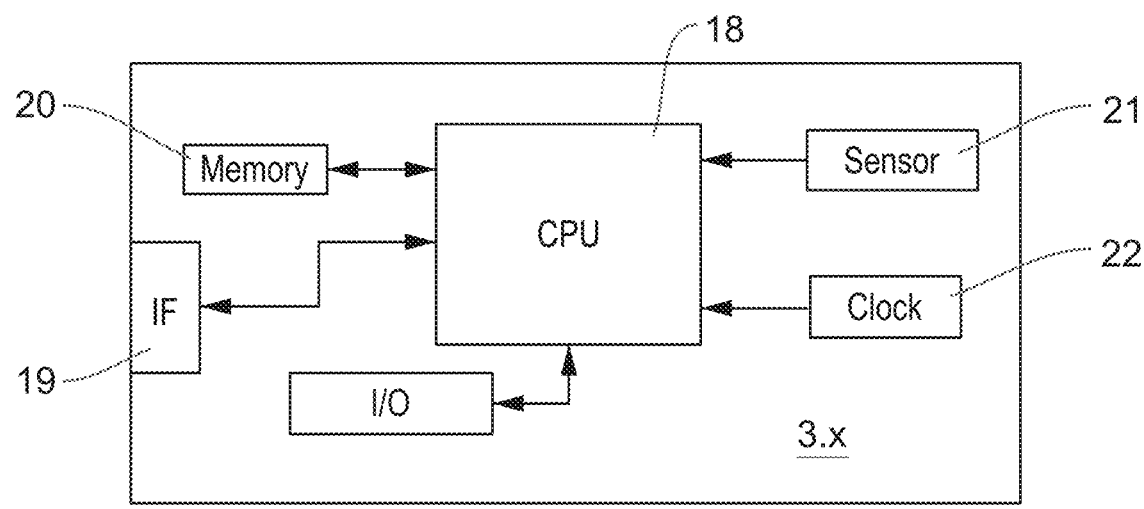
FIG. 3 is a schematic of the units involved on the observer entity side.

FIG. 3 shows a schematic of the components of an observer entity 3.*x*. The observer entity 3.*x* also comprises a processor 18 which may be comprised by a plurality of individual processors performing data processing cooperatively. The processor 18 is connected to an interface 19 used for receiving and transmitting messages including data to and from the vehicle 2 and the external, trusted server 5.

The processor 18 is further connected to a memory 20 which is intended to store at least the software for conducting the data processing in processor 18 and also the keys that might be used for encryption or signature generation for the messages as will be described below.

Figure 4:
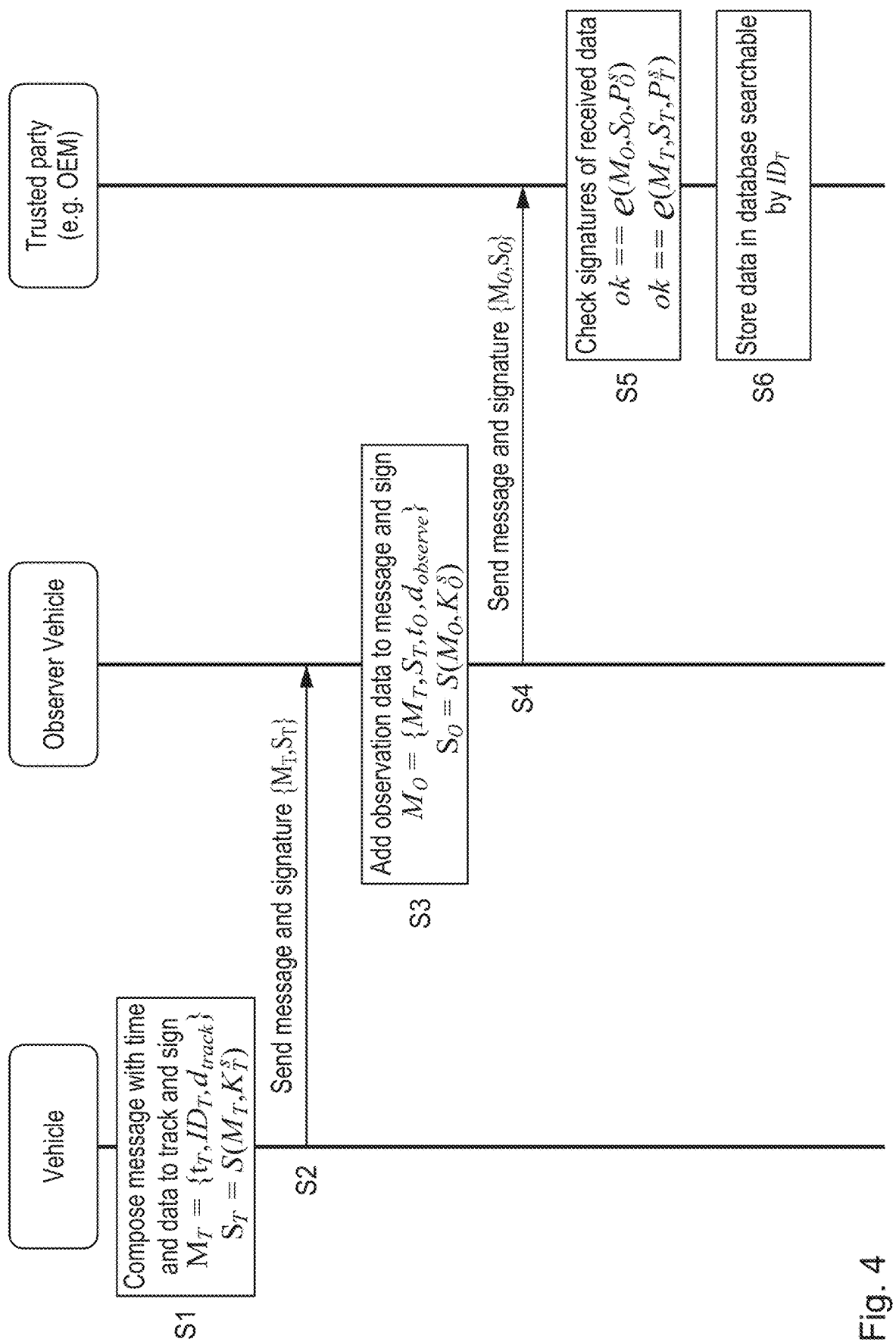
FIG. 4 is an illustration of the generation of entries in the external database according to a first embodiment of the present invention.

Further, the processor 18 receives information from one or more sensors 21 in order to obtain information that shall be added to a message received from the vehicle 2. Examples for such sensors 21 are cameras and a GPS system. The camera may be used in case that the observer entity 3.*x* is a speed camera 3.5 as illustrated in FIG. 4 or a toll station in order to determine the registration number from the number plate of the vehicle 2. In case of a GPS, determination of the current position of the observer entity 3.*x* can be performed on board, which is particularly useful in case that observer entity 3.*x* is a movable entity such as another vehicle 3.1. Obviously, the examples given for the sensors 21 are not limiting and other sensors may be used providing any kind of information that can be added to the received method in order to enhance the data stored in the external database 6, which is the basis for validation of the vehicle usage data.

The observer entity 3.*x* may further comprise an internal clock 22 connected to the processor 18. Based on information received from the internal clock 22, the processor 18 generates a timestamp that is, in addition to the information received from the sensors 21, added to the message received from the vehicle 2. Alternatively, the timestamp may be derived from information received from the sensors 21. For example, the timestamp may analyzed from a GPS signal received when determining the position information as additional data.

Figure 5:
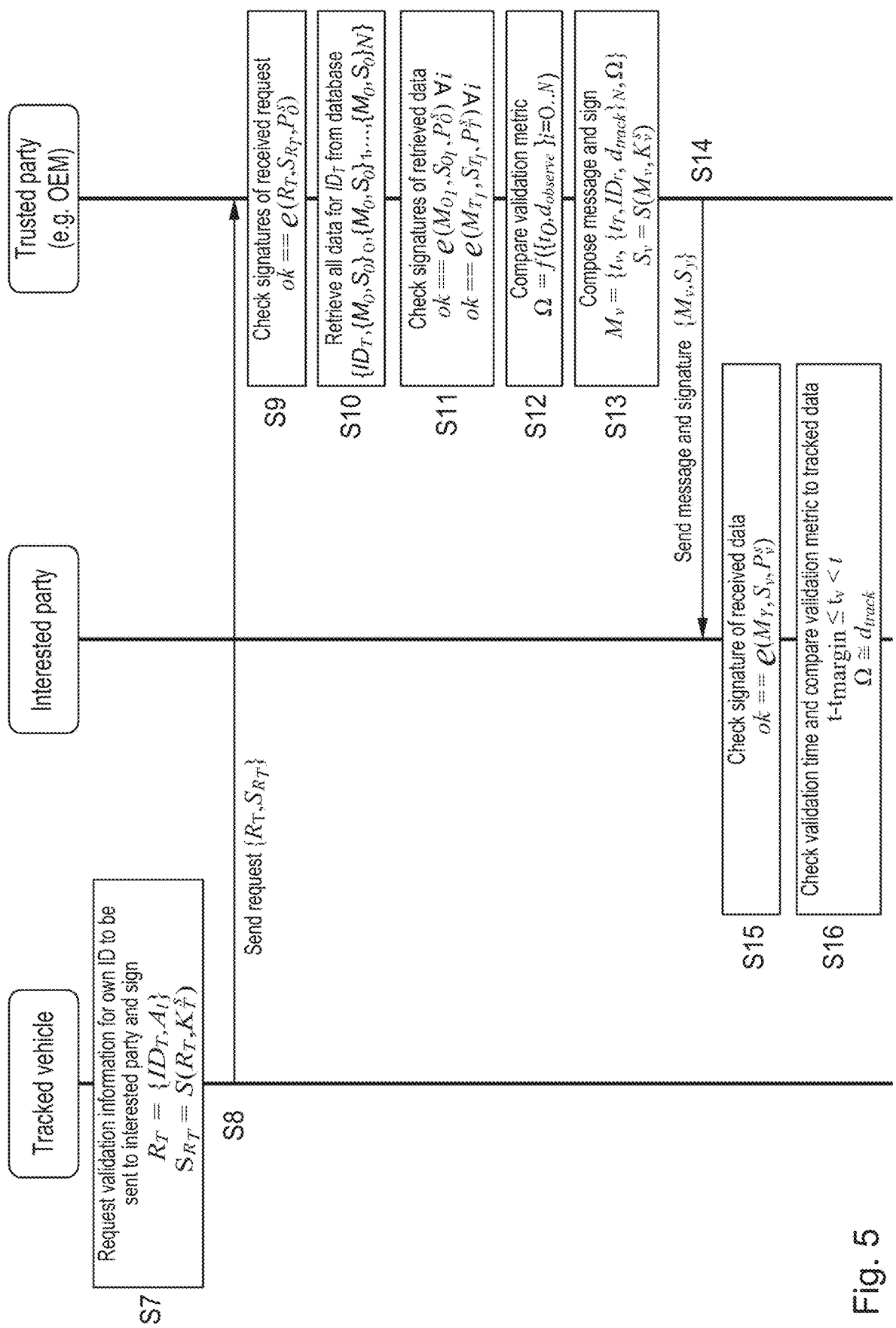
FIG. 5 is an illustration of the generation of the information on the validation according to the first embodiment.

Referring to FIGS. 4 and 5, a first implementation of the invention will be described in more detail, specifically with respect to the data transmission that is performed between the vehicle 2, the other vehicle 3.1 as one example for an observer entity 3.*x*, and the external, trusted server 5. In the first implementation of the invention, signed clear-text messages are used for the communication between the vehicle 2, the other vehicle 3.1, and the external, trusted server 5.

After the vehicle 2 recognizes proximity to the other vehicle 3.1, or gets a request from the other vehicle 3.1, the vehicle 2 generates a message including vehicle data, which contains vehicle usage data $d_{track}$ (e.g. meter data), vehicle identification information $ID_T$ and the time the data was created $t_T$ in step S1. This message is then signed with a signature $S_T$ (validation token) using a private key $K_T^s$ of the vehicle 2. This ensures that nobody else can generate or manipulate data in messages sent by the vehicle 2. The message $M_T$ and the corresponding signature $S_T$ are sent to the other vehicle 3.1 in step S2.

In step S3, the other vehicle 3.1 generates joint data in a new message $M_O=\{M_T, S_T, t_O, d_{observe}\}$ which contains the message $M_T=\{t_T, ID_T, d_{track}\}$ and signature $S_T$ of the vehicle 2 plus additional observer data $d_{observe}$ (e.g. GPS position) and time of the observer data $t_O$ (timestamp) generated by the other vehicle 3.1. The other vehicle 3.1 also generates a signature $S_O$ (validation token) for its new message in order to prevent tampering. The new message $M_O=\{M_T, S_T, t_O, d_{observe}\}$ (comprising the joint data) and signature $S_T$ are then sent to a trusted party, namely the external, trusted server 5 (step S4) storing all the messages (step S6) in its database 6. Prior to storing, the trusted party (external, trusted server 5) checks the signatures $S_T$ and $S_O$ using the public keys $P_O^s$ and $P_T^s$ of the other vehicle 3.1 and the vehicle 2. The data entries are indexed with the vehicle identification information in order to ease a later retrieval.

The validation procedure for validating the vehicle usage data (e.g. meter reading) according to a preferred embodiment is initiated by the vehicle 2 in response to a respective trigger operation input to the input/output terminal 17 by the vehicle owner. The vehicle 2 generates a request in step S7, including information on its own identity and also information on an intended recipient (interested party) of the validation information (for example an (email) address $A_I$, i.e. where the validation data shall be sent). In step S8, the vehicle 2 sends the validation request $R_T$ to the trusted party. The request is also signed by the vehicle's private key $K_T^s$. The trusted party can check the signature $S_T$ in step S9 in order to ensure only authorized requests for the data stored.

The validation works as follows: First, the trusted party retrieves all new messages $M_O=\{M_T, t_O, d_{observe}\}$ related to the 2 using the vehicle identification information (step S10). Then, it rechecks all included data and signatures $S_T$ and $S_O$ in step S11 in order to detect and prevent database frauds. Using the added data, the trusted party then computes a validation metric $\Omega$ in step S12 as a usage estimation value. For example, it could just add up the distances between time-wise sorted GPS positions of all the observer entities 3.1 that provided position information to get a lower bound of the travelled distance of the vehicle 2. The trusted party packs the validation metric $\Omega$ together with a time of the validation $t_V$ and the last known vehicle usage data $\{t_T, ID_T, d_{track}\}_N$ into a validation message $M_V$ as information on validity, to which the trusted party adds a signature $S_V$ generated using its private key $K_V^s$ (step S13).

Figure 6:
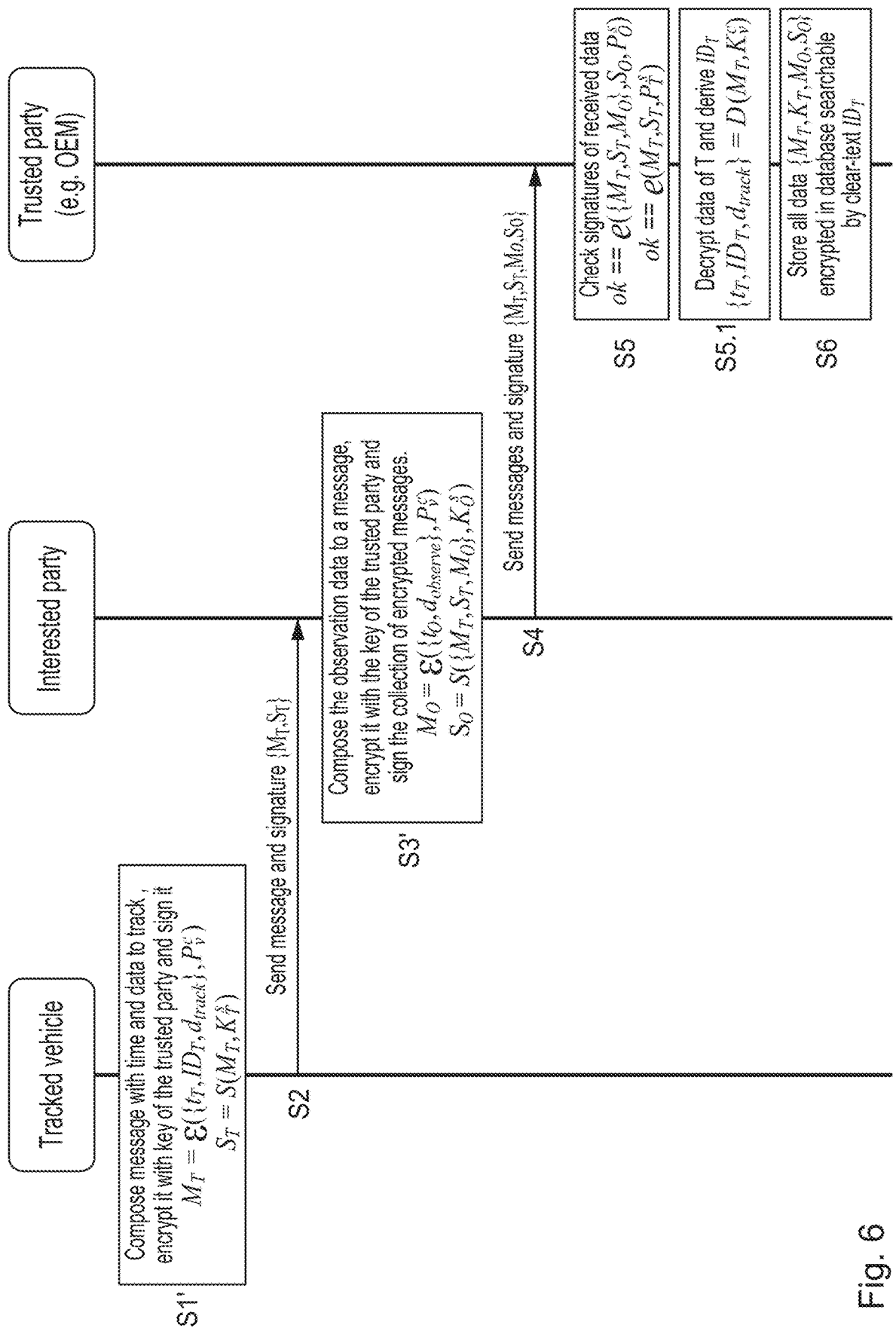
FIG. 6 is an illustration of the generation of entries in the external database according to a second embodiment of the present invention.

Then, the trusted party sends the validation message $M_V$ and signature $S_V$ to the interested party (step S14), which is either the inquirer or, as illustrated in FIG. 5, the dedicated recipient. The interested party can check the signature $S_V$ of the validation message $M_V$ in step S15 in order to make sure it was computed by the trusted party and compare the validation time to the current time t to make sure that the validation data is up-to-date. Then, the interested party computes its own check using the validation metric $\Omega$ and the vehicle usage data in step S16, e.g. it compares the summed GPS distances to the last meter reading of the vehicle 2 in order to decide whether the meter data is plausible or not, for example, by defining a factor up to which the meter data is allows to be higher than the summed GPS distances due to missing observations. It is to be noted that the "interested party" which is mentioned as conducting several method steps, in fact is not a human but a processer owned by an interested person. If the "interested person" is the vehicle owner, this could be the processor 11 of the vehicle 2. Further, the request might also be generated and sent using a computer, a tablet, a smart phone or the like and the validation message is then sent back to this hardware. Alternatively, the message is sent to the hardware of the third person which, in the illustration of FIG. 6 of the above described example is called "interested party".

In a preferred example ECDSA is used for the signature function S and the corresponding check function $\mathcal{C}$. The transferred vehicle usage data is the current mileage of the vehicle 2 as d_track and the observed GPS position of the other vehicle 3.1 is used as added data $d_{observe}$. The vehicle-identification number (VIN) unique to each vehicle is used as vehicle identification information $ID_T$. As mentioned above, the validation function $f$ used to generate the validation metric $\Omega$ comprises the steps of sorting the observed and stored GPS positions (in $d_{observe}$) by observation time $t_O$ (timestamp), calculate the distances (based on air-line distance or calculated routes) between those observations and sum them up over all derived distances i=0 . . . N. The interested party can than check the validation metric $\Omega$ against the last reported mileage (d_track) by dividing both and check if the resulting ratio is within an acceptable range. This range can be individually defined by each party or shared among all. Optionally, the interested party can additionally use the last reported mileage and its corresponding time $t_T$ to check the plausibility of the mileage currently reported by the tracked vehicle.

Figure 7:
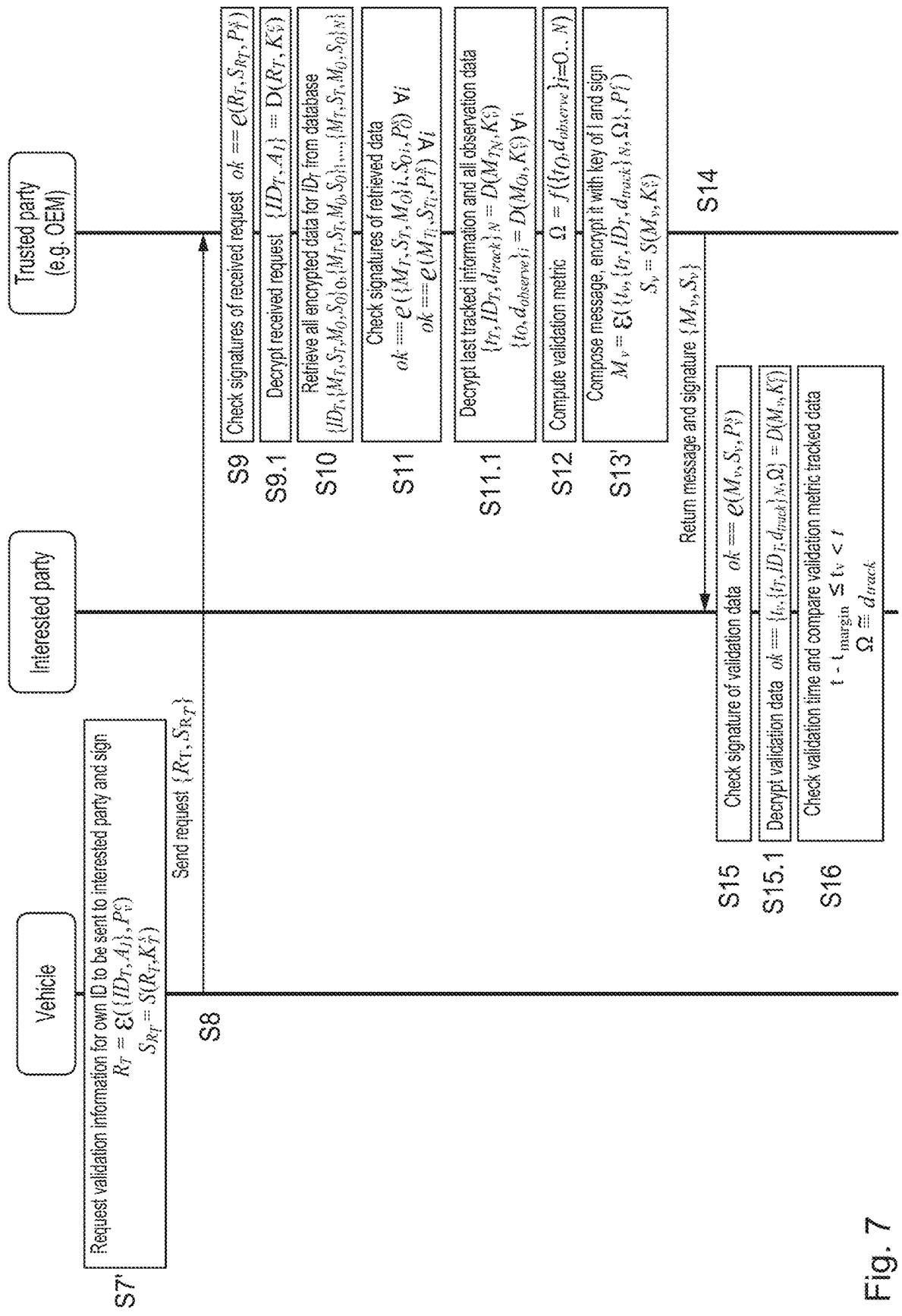
FIG. 7 is an illustration of the generation of the information on the validation according to the second embodiment.

According to a further preferred example, the security of data transmission is increased by additionally encrypting the transmitted messages. The second example will now be described with reference to FIGS. 6 and 7. In order to avoid unnecessary repetition, it is emphasized that this second implementation is based on the first implementation as illustrated in FIGS. 4 and five.

In this improved implementation, all the sent data is additionally encrypted with a public key $P_V^c$ of the trusted party in order to prevent eavesdropping by adversarial parties. This means that the whole data gathering procedure is equivalent to the firstr implementation illustrated in FIGS. 4 and 5, but the vehicle data fir, $\{t_T, ID_T, d_{track}\}$ and added data $\{t_O, d_{observe}\}$ are encrypted in steps S1' and S3' with the public key $P_V^c$ of the trusted party before they are signed and sent. The trusted party, after checking the signatures in step S5, decrypts in step S5.1 the vehicle's message $M_T=\{t_T, ID_T, d_{track}\}$ with its private key $K_V^c$ in order to get the vehicle identification information. Then, it stores the encrypted messages under the index of the vehicle identification information.

As everything was sent encrypted, adversarial parties intercepting the messages cannot neither infer (private) data from the vehicle 2 nor the observer entity 3.x.

The validation process is also similar to the first implementation. The difference is that the request which is generated in step S7' is encrypted and that the trusted party needs to decrypt all the stored data of the vehicle 2 and observer vehicle 3.1 in additional steps S9.1 and S11.1 before the validation metric $\Omega$ will be computed. Also, the trusted party will encrypt the validation message with the public key $P_I^c$ of the interested party in step S13' in order to prevent adversarial parties from eavesdropping. The interested party needs to decrypt the validation message in step S15.1 with its private key $K_I^c$ but the validation computation is the same as in the first implementation described above.

Additionally, to the algorithms used in the first example for an implementation as shown in FIGS. 4 and 5, an RSA algorithm is used for the encryption function $\varepsilon$ and its corresponding decryption function $\mathcal{D}$.

Figure 8:
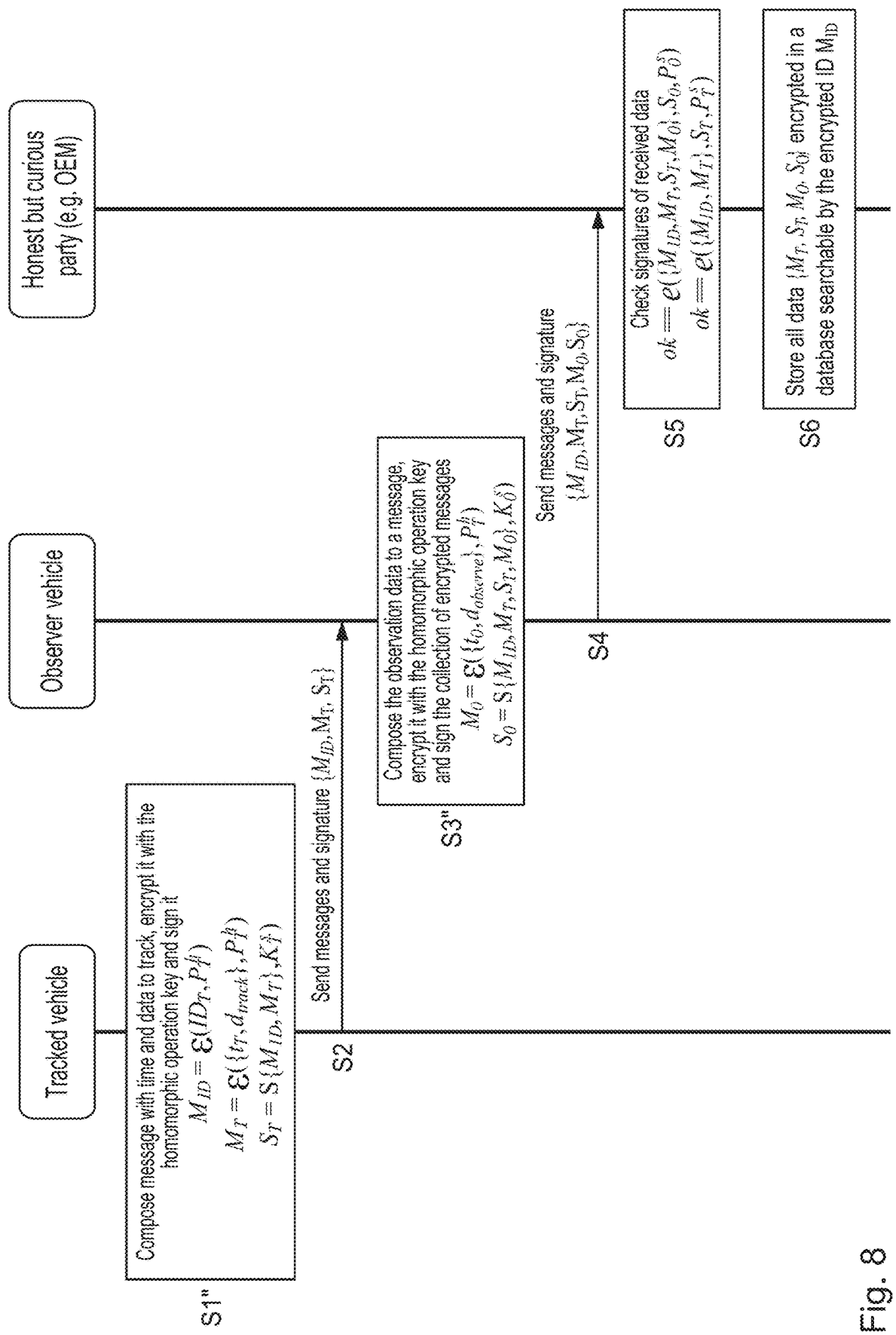
FIG. 8 is an illustration of the generation of entries in the external database according to a third embodiment of the present invention.

A last implementation will be described as a further example with reference to FIGS. 8 and 9. This embodiment is an alternative of the second implementation and uses a homomorphic encryption scheme. The homomorphic encryption scheme allows to have an honest but curious party to store the data and compute the validation metric instead of the trusted party as mentioned above. In this context, "honest" means that the party calculating the usage estimation value will calculate the actual function as desired (in contrast to using a manipulated mathematical function). "Curious" means this party wants to learn something about the vehicle 2 (e.g. the mileage or position or position history) or the observer entity 3.x (e.g. its position) potentially representing private data.

To prevent leakage of this information, the data stays encrypted all the time even while being processed. Thus, the trusted party storing and processing the data can neither infer the actual data nor the processing result. The main difference, beside the different encryption scheme, is that the messages are encrypted with the public (homomorphic encryption) key $P_T^h$ of the vehicle 2 to transform them to the homomorphic, encrypted space as it can be seen in steps S1" and S3". On the other side, no decryption by the honest but curious party is necessary.

In addition to the functions and information used in the second implementation, here the Brakerski-Gentry-Vaikuntanathan (BGV) scheme is used as homomorphic encryption scheme.

Figure 9:
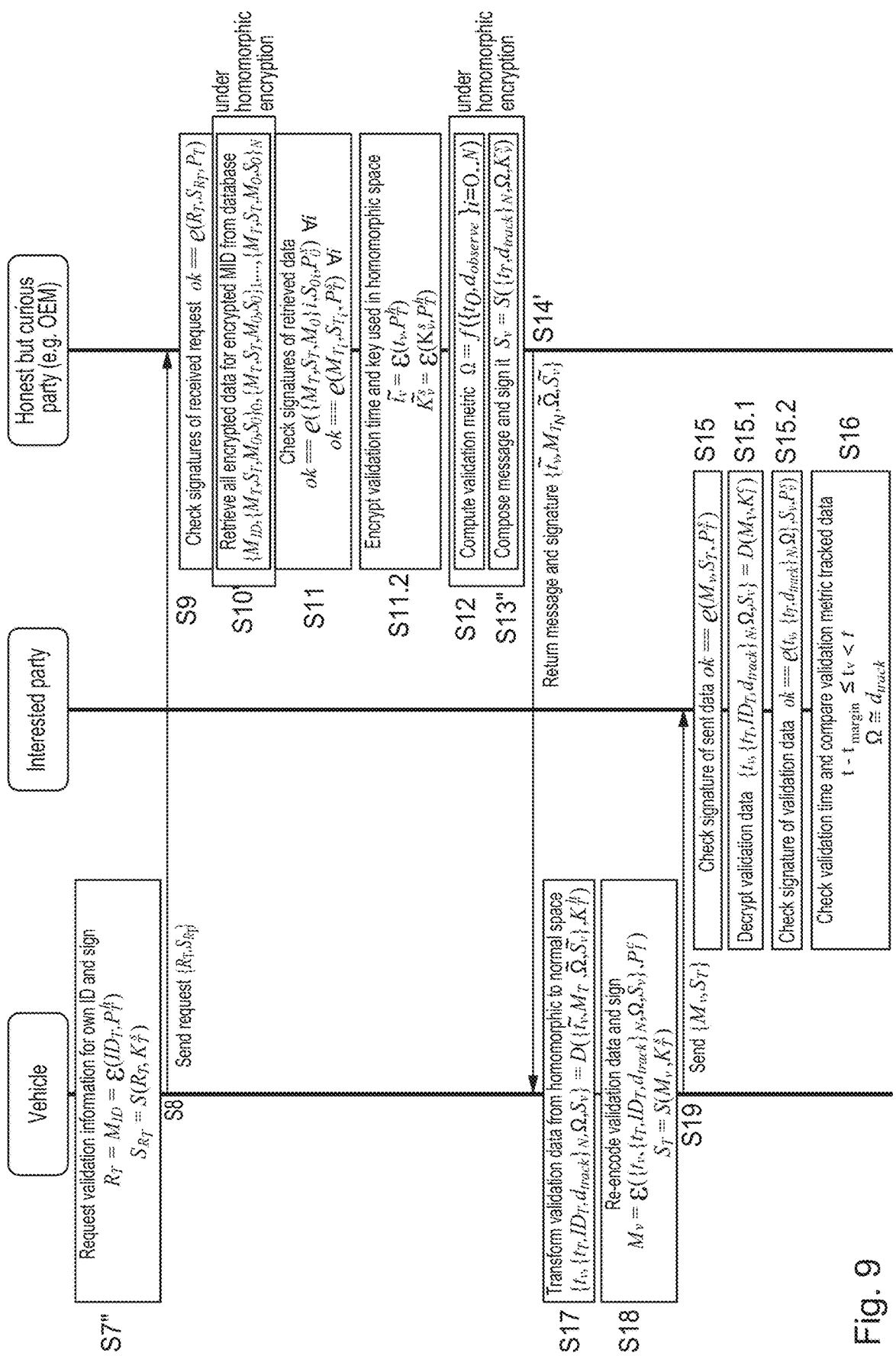
FIG. 9 is an illustration of the generation of the information on the validation according to the third embodiment.

The validation process is running completely within the homomorphic encryption space, i.e. the untrusted party is performing the validation computation on the encrypted data as it is indicated in FIG. 9 explicitly for the steps S10', S12 and S13". To enable processing entirely in the encrypted space, the time of validation as well as the key used in the homomorphic space are encrypted in additional step S11.2. The result is also encrypted before it is sent in step S14. Thus, the untrusted party sends its validation result/message to the vehicle 2 for decryption in step S17.

An important difference is also the signing of the validation data result. This needs to be done on the homomorphic encryption space. For doing so, the untrusted party needs to encrypt its private signature key with the public homomorphic encryption key of the vehicle 2. Then, the untrusted party can compute the signature within the homomorphic encryption space in step S13". When the vehicle 2 then decrypts the validation message in step S17, it also gets the signature of the untrusted party which shows that the result was generated by the untrusted party. This can be checked by the interested party to which the vehicle 2 sends the decrypted validation message. When the interested party is not the vehicle 2, the validation data is read and coded in step S18 and the thus generated message is signed by the vehicle 2. Then, in step S19, the signed message is transmitted to the interested party, which carries out the same steps as already shown in FIG. 7 and additionally after step S15.1 the signature of the validation sate received from the vehicle 2 is checked in step S15.2.

The interested party can then perform a plausibility check as in the implementations described with reference to FIGS. 4 to 7.

The invention claimed is:

1. A method for verifying vehicle usage data reflecting mileage or an operating hours count of a vehicle, the method comprising:
   a) sensing mileage or operating hours of the vehicle by a sensor of the vehicle;
   b) transmitting, by the vehicle, vehicle data to a first observer entity when the vehicle and the first observer entity are in proximity, wherein the vehicle data comprises unique vehicle identification information and vehicle usage data including the mileage or the operating hours retrieved from the sensor, and wherein proximity is defined by an upper threshold for a distance between the vehicle and the first observer entity;
   c) generating, by the first observer entity, first joint data by adding first data to the vehicle data, the first data being correlated to vehicle usage to include at least an indication of a position of the first observer entity;

d) transmitting the first joint data to an external database and storing the first joint data in the external database;

e) repeating steps a) to d) at least once using a second, different observer entity to generate at least second joint data by adding, to the vehicle data, second data comprising at least an indication of a position of the second observer entity;

f) calculating, by a central processor connected to the external database, from at least the first data and the second data, a usage estimation value which is a measure for the mileage or the operating hours count of the vehicle by at least accumulating distances between successive positions derived from the added data during step e);

g) comparing, by the central processor, the usage estimation value with the vehicle usage data retrieved from the sensor of the vehicle; and h) generating, by the central processor, a validation token on the results of the comparison, and transmitting the validated results to a unit that requested verification of the vehicle usage data such that verification of the vehicle usage data can be performed by the unit that requested verification, wherein in case of availability of a number of potential observer entities exceeding an upper threshold, types of the potential observer entities are determined by the vehicle, a selection of a subset of the observer entities is performed by the vehicle based on the determined types of the potential observer entities and the vehicle data is transmitted by the vehicle to the subset of observer entities, only.

2. The method according to claim 1,
wherein the first data further comprises a first time stamp indicating a time when the vehicle data was received by the first observer entity, and
the second data further comprises a second time stamp indicating a time when the vehicle data was received by the second observer entity.

3. The method according to claim 1, wherein each time the vehicle transmits vehicle data to the first observer entity or the second observer entity, the vehicle simultaneously transmits vehicle usage data to the external database.

4. The method according to claim 1, wherein the comparison of the vehicle usage data and the usage estimation value is performed by the central processor, which is part of a central server that contains the external database.

5. The method according to claim 1, wherein the vehicle adds a second validation token to the vehicle data to be transmitted to the first observer entity or the second observer entity.

6. The method according to claim 1, wherein
after adding the first data to the vehicle data by the first observer entity, the first observer entity adds a third validation token to the first joint data before the first joint data is transmitted to the external database, and
after adding the second data to the vehicle data by the second observer entity, the second observer entity adds a fourth validation token to the second data before the second joint data is transmitted to the external database.

7. The method according to claim 6, wherein,
for transmitting the first joint data to the external database, the first joint data is first sent back to the vehicle which encrypts the first joint data and then forwards the same to the external database, and
for transmitting the second joint data to the external database, the second joint data is first sent back to the vehicle which encrypts the second joint data and then forwards the same to the external database.

8. The method according to claim 1, wherein the vehicle data is encrypted before the vehicle data is sent to the first or second observer entity.

9. The method according to claim 1, wherein
the first observer entity encrypts at least the first data, and
the second observer entity encrypts at least the second data.

10. The method according to claim 1, wherein at least one of the first observer entity and the second observer entity is a movable entity and this movable entity determines its own position.

11. The method according to claim 1, wherein at least one of the first observer entity and the second observer entity is a stationary unit.

12. The method according to claim 11, wherein the stationary unit transmits further information associated with a timestamp to the external database, the further information characterizing usage of the vehicle.

13. The method according to claim 1, wherein the central processor generates the information on the validity of the vehicle usage data upon request from an inquirer and outputs the information together with a signature to the inquirer or a recipient defined in the request.

14. The method according to claim 1, wherein the information on the validity is generated using privacy-preserving computation.

15. The method according to claim 1, wherein the first observer entity and the second observer entity are participants in a vehicle-to-everything-system V2X or elements of a governmental system used for traffic monitoring.

16. A system for verifying vehicle mileage or an operating hours count of a vehicle, the system comprising:
the vehicle,
at least a first observer entity and a second observer entity different from the first observer entity,
an external database, and
a central processor,
wherein the vehicle comprises a metering unit configured to generate the vehicle usage data by sensing mileage or operating hours of the vehicle, a processor configured to process the vehicle usage data, and a data communication unit configured to transmit vehicle data comprising unique vehicle identification information and vehicle usage data including the mileage or the operating hours retrieved from the metering un it to the first observer entity when the vehicle and the first observer entity are in proximity,
wherein the proximity is defined by an upper threshold for a distance between the vehicle and the first observer entity, and the data communication unit is configured to transmit the vehicle data comprising the unique vehicle identification information to the second observer entity when the vehicle and the second observer entity are in the proximity,
wherein the first observer entity comprises a data communications unit configured to communicate with the vehicle's communication unit, and a first processor configured to add first data comprising an indication of a position of the first observer entity and a timestamp indicating a time of reception of the vehicle data to the vehicle data thereby generating first joint data,
wherein the second observer entity comprises a second data communications unit configured to communicate with the vehicle's communication unit, and a second processor configured to add second data comprising an indication of a position of the second observer entity and a timestamp indicating a time of reception of the vehicle data to the vehicle thereby generating second joint data, wherein the external database is connected to the central processor, wherein the central processor is configured to store at least the first joint data and the second joint data received in the database and to calculate, from at least the first data and the second data, a usage estimation value which is a measure for the mileage or the operating hours count of the vehicle by at least accumulating distances between successive positions derived from the added data, wherein the central processor is configured to compare the usage estimation value with the vehicle usage data, and to generate a validation token on the results of the comparison, and to transmit the validated results to a unit that requested verification of the vehicle usage such that verification of the vehicle usage data can be performed by the unit that requested verification, and wherein, in case of availability of a number of potential observer entities exceeding an upper threshold, the vehicle is configured to determine types of the potential observer entities, to select a subset of observer entities based on the determined types of the potential observer entities and to transmit the vehicle data only to the selected subset of observer entities.

17. The system according to claim 16, wherein the vehicle, the first and second observer entities or the central processor is/are configured to add a second validation token to the respective data before transmission.

18. The system according to claim 16, wherein the first and second observer entities are configured to transmit the first and second joint data back to the vehicle, respectively, and that the vehicle is configured to encrypt the first and second joint data before forwarding the first and second joint data to the external database.

19. The system according to claim 16, wherein at least one of the first and second observer entities is a movable entity which is configured to determine its own position.

20. The system according to claim 16, wherein the first and second observer entities comprises stationary units configured to transmit further information associated with the timestamp to the external database, the further information being indicative on usage of the vehicle.

21. The system according to claim 16, wherein the vehicle is configured to encrypt the vehicle data, the first and second observer entities are configured to encrypt the first and second data, respectively, and/or the central processor is configured to encrypt the vehicle usage data.

22. The system according to claim 21, wherein the central processor is configured to perform data processing in the encrypted space.

23. The system according to claim 16, wherein the first and second observer entities are participants in a vehicle-to-everything-system or elements of a governmental system used for traffic monitoring.

* * * * *